US012743474B2

(12) United States Patent
Banipal et al.

(10) Patent No.: US 12,743,474 B2
(45) Date of Patent: Sep. 22, 2026

(54) PATTERN ANALYSIS AND NAVIGATIONAL MECHANISM

(71) Applicant: International Business Machines Corporation, Armonk, NY (US)

(72) Inventors: Indervir Singh Banipal, San Jose, CA (US); Shikhar Kwatra, San Jose, CA (US); Nadiya Kochura, Bolton, MA (US); Sourav Mazumder, Contra Costa, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 19/009,564

(22) Filed: Jan. 3, 2025

(65) Prior Publication Data

US 2026/0195390 A1 Jul. 9, 2026

(51) Int. Cl.

*G06F 16/953* (2019.01)
*G06F 16/955* (2019.01)
*G06N 5/02* (2023.01)

(52) U.S. Cl.

CPC .......... *G06F 16/953* (2019.01); *G06F 16/955* (2019.01); *G06N 5/02* (2013.01)

(58) Field of Classification Search

CPC ........ G06F 16/953; G06F 16/955; G06N 5/02
See application file for complete search history.

(56) References Cited

U.S. PATENT DOCUMENTS

| | | |
|---|---|---|
| 6,993,586 B2 | 1/2006 | Chen et al. |
| 8,032,518 B2 | 10/2011 | Fox et al. |

(Continued)

FOREIGN PATENT DOCUMENTS

| | | |
|---|---|---|
| CN | 102782633 A | 5/2015 |
| IN | 202441050795 A | 7/2024 |

OTHER PUBLICATIONS

"Apache Nutch™", https://nutch.apache.org/, Aug. 28, 2024, 02 pages.

(Continued)

*Primary Examiner* — Mark E Hershley
(74) *Attorney, Agent, or Firm* — Amin, Turocy & Watson, LLP

(57) ABSTRACT

A system includes a processor that executes computer executable components stored in a memory. The computer executable components can include a generation component that generates a knowledge graph of a web-based application, and an intent component that receives a query and predicts an intent based upon the received query. The computer executable components can further include an identification component that identifies a target feature associated with the web-based application based upon the predicted intent, determines a criticality of the feature based upon the predicted intent, and assigns a weight to the feature based upon the determined criticality. The computer executable components can further include a detection component that detects presence of dark patterns, and an extraction component that, upon a detection of dark patterns by the dark pattern detection component, identifies a link in the web-based application associated with the target feature, extracts the link, and displays the extracted link.

20 Claims, 9 Drawing Sheets

(56) References Cited

U.S. PATENT DOCUMENTS

| | | | | |
|---|---|---|---|---|
| 8,156,448 | B2 * | 4/2012 | Niyogi | G06F 16/9558 715/854 |
| 8,201,227 | B2 * | 6/2012 | Bauchot | H04L 63/08 345/32 |
| 8,429,597 | B2 * | 4/2013 | Prigge | G06F 8/38 717/104 |
| 9,106,942 | B2 | 8/2015 | Menon | |
| 11,563,762 | B2 * | 1/2023 | Bitton | H04L 63/1441 |
| 11,770,417 | B2 * | 9/2023 | Redlich | G06F 16/23 707/754 |
| 12,430,646 | B2 * | 9/2025 | Seguritan | G06Q 20/4016 |
| 12,523,999 | B2 * | 1/2026 | Davis | G05B 15/02 |
| 2012/0158703 | A1 * | 6/2012 | Li | G06F 16/3349 707/723 |
| 2013/0326427 | A1 * | 12/2013 | Elias | G06F 9/451 715/854 |
| 2014/0026083 | A1 * | 1/2014 | Waisbein | G06F 16/2457 715/763 |
| 2014/0075004 | A1 * | 3/2014 | Van Dusen | G06F 16/90335 709/223 |
| 2015/0026105 | A1 * | 1/2015 | Henrichsen | G06Q 30/0251 706/12 |
| 2018/0232659 | A1 * | 8/2018 | Ranatunga | G06Q 30/0241 |
| 2020/0004873 | A1 * | 1/2020 | Chang | G06F 16/31 |
| 2020/0326924 | A1 * | 10/2020 | A | G06F 16/9024 |
| 2021/0232374 | A1 * | 7/2021 | Weibel | G06F 11/34 |
| 2021/0319100 | A1 * | 10/2021 | Coyle-Gilchrist | G06F 21/57 |
| 2023/0199014 | A1 * | 6/2023 | Swift | H04L 63/1433 726/25 |
| 2023/0245141 | A1 * | 8/2023 | Teleki | G06F 18/2178 705/7.29 |
| 2023/0401274 | A1 * | 12/2023 | Denninghoff | G06F 16/9538 |
| 2024/0061690 | A1 * | 2/2024 | Dauber | G06F 16/954 |
| 2024/0112042 | A1 * | 4/2024 | Harris | G06N 20/00 |
| 2024/0184906 | A1 * | 6/2024 | Taylor | G06F 21/6218 |
| 2024/0273793 | A1 * | 8/2024 | DeCharms | G06F 3/0484 |
| 2024/0281410 | A1 * | 8/2024 | Williams | G06F 16/122 |
| 2024/0386015 | A1 * | 11/2024 | Crabtree | G06F 16/245 |
| 2025/0111003 | A1 * | 4/2025 | Yadav | G06F 9/451 |
| 2025/0291942 | A1 * | 9/2025 | Mclaughlin, III | G06N 20/00 |

OTHER PUBLICATIONS

"Beautiful Soup Documentation", https://www.crummy.com/software/BeautifulSoup/bs4/doc/, Aug. 28, 2024, 64 pages.

"Norwegian Consumer Council", https://en.wikipedia.org/wiki/Norwegian_Consumer_Council, Retrieved on Aug. 28, 2024, 03 pages.

Dutta Sujan, "How I used Machine Learning to detect chat screenshots on my phone", Published in Towards Data Science, Dec. 21, 2019, 17 pages.

Grauer Yael, "Dark Patterns are designed to trick you (and they're all over the Web)", https://arstechnica.com/information-technology/2016/07/dark-patterns-are-designed-to-trick-you-and-theyre-all-over-the-web/, Jul. 28, 2016, 07 pages.

Ramteke et al., "Unmasking Dark Patterns: A Machine Learning Approach to Detecting Deceptive Design in E-commerce Websites", arXiv:2406.01608v1, May 27, 2024, 05 pages.

Sitikhu et al., "A Comparison of Semantic Similarity Methods for Maximum Human Interpretability", arXiv:1910.09129, Oct. 31, 2019, 04 pages.

Wanders Ignaz, "Build your own Knowledge Graph", Published in VectrConsulting, https://medium.com/vectrconsulting/build-your-own-knowledge-graph-975cf6dde67f, Oct. 18, 2018, 17 pages.

Vázquez, F.,"The Data Fabric for MachineLearning. Part 2: Building aKnowledge-Graph", Retrieved from: https://medium.com/data-science/the-data-fabric-for-machine-learning-part-2-building-a-knowledge-graph-2fdd1370bb0a, Apr. 5, 2019, 22 pages.

* cited by examiner

700

$\frac{\partial W}{\partial s} \propto \frac{\partial t}{\partial s}$

702

Two-tailed $H_0: \mu = 23$ $H_1: \mu \neq 23$

One-tailed

Left-tailed $H_0: \mu \geq 23$ $H_1: \mu < 23$

704

706

708

710

800

PATTERN ANALYSIS AND NAVIGATIONAL MECHANISM

BACKGROUND

The subject disclosure relates to reduction of navigation time for devices and sites, e.g., dark pattern modulation in correlation with personalized knowledge graphs.

Dark patterns are design choices that exploit cognitive biases or create confusion. Instead of facilitating user needs, dark patterns often derail users by complicating workflows. Dark patterns are especially prevalent in websites and apps where users seek specific features or assistance. These practices may include hiding critical functions, placing unnecessary steps between the user and their goal, or presenting information in a deliberately confusing manner. The results is wasted time, frustration, and unintended actions, such as accidental purchases or sharing of personal data. As digital platforms become integrated into everyday life, the frequency and sophistication of dark patterns continues to evolve. Addressing the issue of dark patterns is critical to improving user experience and fostering ethical design practices. Users require better tools to identify and navigate manipulative designs effectively.

SUMMARY

The following presents a summary to provide a basic understanding of some embodiments of the invention. This summary is not intended to identify key or critical elements or delineate any scope of the particular embodiments or any scope of the claims. Its sole purpose is to present concepts in a simplified form as a prelude to the more detailed description that is presented later. In some embodiments described herein, systems, computer-implemented methods, and/or computer program products that facilitate reduction of navigation time for devices and sites are provided.

According to an embodiment, a system can comprise a processor that executes computer executable components stored in memory. The computer executable components can comprise a generation component that generates a knowledge graph of a web-based application, and an intent component that receives a query and predicts an intent based upon the received query. The computer executable components can further comprise an identification component that identifies a target feature associated with the web-based application based upon the predicted intent, determines a criticality of the feature based upon the predicted intent, and assigns a weight to the feature based upon the determined criticality. The computer executable components can further comprise a detection component that detects presence of dark patterns, and an extraction component that, upon a detection of dark patterns by the dark pattern detection component, identifies a link in the web-based application associated with the target feature, extracts the link, and displays the extracted link.

According to another embodiment, a computer-implemented method can comprise generating, by a system operatively coupled to a processor, a knowledge graph of a web-based application. The computer-implemented method can further comprise receiving, by a system, a query and predicting an intent based upon the received query. The computer-implemented method further comprises identifying, by a system, a target feature associated with the web-based application based upon the predicted intent. The computer-implemented method can further comprise determining, by a system, a criticality of the feature based upon the predicted intent. The computer-implemented method can further comprise assigning, by a system, a weight to the feature based upon the determined criticality. The computer-implemented method can further comprise detecting, by a system, presence of dark patterns. The computer-implemented method can further comprise, upon a detection of dark patterns, identifying, by a system, a link in the web-based application associated with the target feature. The computer-implemented method can further comprise extracting, by a system, the link, and displaying, by a system, the extracted link.

According to another embodiment, a computer program product comprising a computer readable storage medium having program instructions embodied therewith, the program instructions executable by a processor to cause the processor to generate, by the processor, a knowledge graph of a web-based application. The program instructions can also cause the processor to receive, by the processor, a query and predict, by the processor, an intent based upon the received query. The program instructions can also cause the processor to identify, by the processor, a target feature associated with the web-based application based upon the predicted intent. The program instructions can also cause the processor to determine, by the processor, a criticality of the feature based upon the predicted intent, The program instructions can also cause the processor to assign, by the processor, a weight to the feature based upon the determined criticality. The program instructions can also cause the processor to detect, by the processor, presence of dark patterns. The program instructions can also cause the processor to, upon a detection of dark patterns, identify, by the processor, a link in the web-based application associated with the target feature. The program instructions can also cause the processor to extract, by the processor, the link. The program instructions can also cause the processor to display, by the processor, the extracted link.

DETAILED DESCRIPTION

Figure 1:
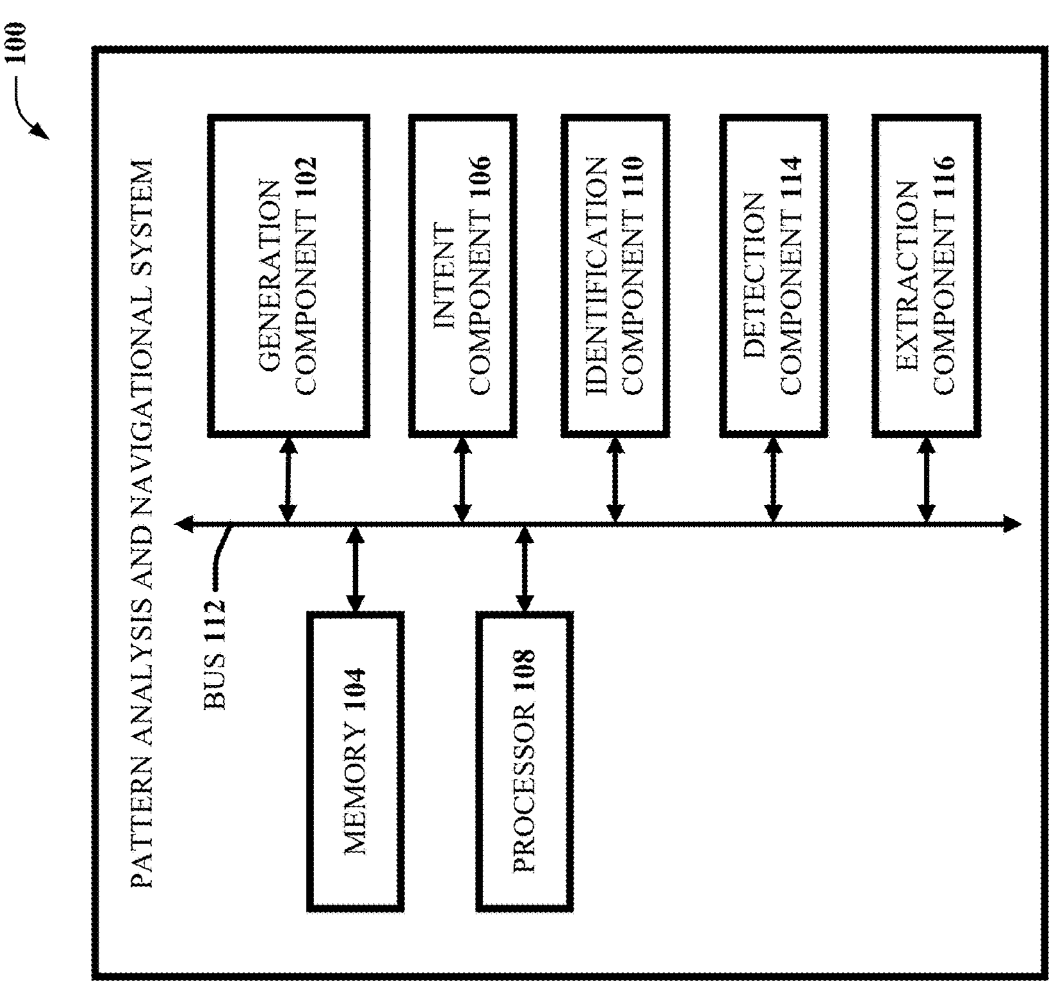
FIGS. 1 and 2 illustrate example systems that can facilitate reduction of navigation time for devices and sites in accordance with some embodiments described herein.

The following detailed description is merely illustrative and is not intended to limit embodiments, applications, and/or uses of embodiments. Furthermore, there is no intention to be bound by any expressed or implied information presented in the preceding Background or Summary sections, or in the Detailed Description section.

In the digital age, user interfaces (UI) and user experiences (UX) have become critical components of websites and applications. While intended to streamline access to features and information, making interactions intuitive and efficient, many modern designs are rife with manipulative practices known as "dark patterns." Dark patterns are intentional design choices that exploit cognitive biases or create confusion. Instead of facilitating user needs, dark patterns often derail users by complicating workflows.

Dark patterns are especially prevalent in websites and apps where users seek specific features or assistance. For instance, users may enter a platform expecting to complete a simple task, such as managing subscriptions, but are instead led down convoluted paths filled with distractions or misleading options. These practices may include hiding critical functions, placing unnecessary steps between the user and their goal, or presenting information in a deliberately confusing manner. This results in wasted time, frustration, and often, unintended actions such as accidental purchases or sharing of personal data.

As digital platforms become integrated into everyday life, the frequency and sophistication of dark patterns continues to evolve. Techniques like forced continuity, hidden fees, and bait-and-switch tactics exploit limited time and attention, making it challenging for users to achieve objectives efficiently. Addressing the issue of dark patterns is critical to improving user experience and fostering ethical design practices. Users require better tools to identify and navigate manipulative designs effectively.

In relation to dark pattern identification and navigation, embodiments of the present disclosure produce a solution to one or more of these problems. These embodiments can solve such problems generating a knowledge graph of a web-based application, receiving a query and predicting an intent based upon the received query, identifying a target feature associated with the web-based application based upon the predicted intent, determining a criticality of the feature based upon the predicted intent, assigning a weight to the feature based upon the determined criticality, detecting presence of dark patterns, identifying a link in the web-based application associated with the target feature, extracting the link and displaying the extracted link.

One or more systems, devices, computer program products, and/or computer-implemented methods provided herein relate dark pattern identification and navigation. A system can include a processor that executes computer executable components stored in memory. The computer executable components can comprise a generation component that generates a knowledge graph of a web-based application, and an intent component that receives a query and predicts an intent based upon the received query. The computer executable components can further comprise an identification component that identifies a target feature associated with the web-based application based upon the predicted intent, determines a criticality of the feature based upon the predicted intent, and assigns a weight to the feature based upon the determined criticality. The computer executable components can further comprise a detection component that detects presence of dark patterns, and an extraction component that, upon a detection of dark patterns by the dark pattern detection component, identifies a link in the web-based application associated with the target feature, extracts the link, and displays the extracted link.

In some embodiments, the knowledge graph generated by the generation component can be composed of a plurality of nodes. The plurality of nodes can comprise at least one of: plain text extraction, scanned PDF understanding through element classification, or OCR extracted entities.

In some embodiments, the identification component can identify the link using semantic matching. In various embodiments, the extraction component can identify the link using cosine similarity. In other embodiments the identified link can be associated with a functionality. In some embodiments, the extracted link can be a hyperlink that is relevant to a user.

In various embodiments, the detection component can detect the dark patterns by identifying unnecessary deflecting visual effects that increase navigation time. The detection component can perform geospatial detection of functionalities in a web layout.

In some embodiments, the system can further comprise a tone down component that can tone down the detected dark patterns. The tone down component can tone down the detected dark patterns by standardizing fonts and visual effects.

In various embodiments, the system of claim can further comprise an artificial intelligence component that can build a generative artificial intelligence model to facilitate target feature identification and dark pattern reduction.

Advantages of this system can include improved user efficiency and satisfaction, and enhanced legal and regulatory compliance.

Some embodiments of the present disclosure are now described with reference to the drawings. In the drawings, like referenced numerals are used to refer to like elements throughout. In the following description, for purposes of explanation, numerous specific details are set forth in order to provide a more thorough understanding of the embodiments. In various cases, some embodiments can be practiced without these specific details, yet a person having ordinary skill in the art will recognize that such embodiments are within metes and bounds of this disclosure.

FIG. 1 illustrates an example system 100 for facilitating reduction of navigation time for devices and sites. The system 100 uses a generation component, an intent component, an identification component, a detection component and an extraction component. The generation component generates a knowledge graph of a web-based application. The intent component receives a query and predicts an intent based upon the received query. The identification component identifies a target feature associated with the web-based application based upon the predicted intent, determines a criticality of the feature based upon the predicted intent, and assigns a weight to the feature based upon the determined criticality. The detection component detects presence of dark patterns. The extraction component, upon a detection of dark patterns by the dark pattern detection component, identifies a link in the web-based application associated with the target feature, extracts the link, and displays the extracted link.

Aspects of systems (e.g., systems 100, 200, and the like), apparatuses, or processes in various embodiments of the present disclosure can constitute one or more machine-executable components embodied within one or more machines. For example, the components can be embodied in one or more computer readable mediums (or media) associated with one or more machines. Such components, when executed by the one or more machines (e.g., computers, computing devices, virtual machines, etc.) can cause the machines to perform the operations described. System 100 can comprise a generation component 102, a memory 104, an intent component 106, a processor 108, an identification component 110, a system bus 112, a detection component 114, and an extraction component 116.

The system 100 and/or the components of the system 100 can use hardware and/or software to solve problems that are highly technical in nature. The system 100 solves problems that are not abstract and that cannot be performed as a set of mental acts by a human. Further, some of the processes can be performed by specialized computers for carrying out defined tasks related to dark pattern identification and navigation. The system 100 and/or components of the system 100 can be employed to solve new problems that arise through advancements in technologies. The system 100 can provide technical improvements to target feature navigation by reducing navigation time for devices and sites.

The system 100 can include a processor 108. In some embodiments, the processor 108 can execute a component or subcomponent associated with the system 100. Components or subcomponents associated with the system 100 can include one or more machine readable, writable, and/or executable instructions. In some embodiments, the system 100 can include a memory 104, and the memory 104 can store one or more components and/or subcomponents associated with the system 100. In some embodiments, the processor 108 can execute a component stored in the memory 104.

In some embodiments, the system 100 can include a computer-readable memory 104 that can be operably connected to the processor 108. The memory 104 can store computer-executable instructions that, upon execution by the processor 108, can cause the processor 108 and/or one or more other components of the system 100 (e.g., the generation component 102, the intent component 106, the identification component 110, the detection component 114, and/or the extraction component 116) to perform one or more actions. In some embodiments, the memory 104 can store computer-executable components (e.g., the generation component 102, the intent component 106, the identification component 110, the detection component 114, and/or the extraction component 116).

The system 100 and/or a component thereof as described herein can be communicatively, electrically, operatively, optically, and/or otherwise coupled to one another via a bus 112. The bus 112 can include one or more of a memory bus, memory controller, peripheral bus, external bus, local bus, and/or another type of bus that can employ one or more bus architectures. In some embodiments, the system 100 can be coupled (e.g., communicatively, electrically, operatively, optically, and/or the like) to one or more external systems (e.g., an electrical output production system, one or more output targets, an output target controller, and/or the like). In some embodiments, the system 100 can be coupled to one or more external sources, and/or devices (e.g., classical computing devices, communication devices, and/or like devices), such as via a network. In some embodiments, one or more of the components of the system 100 can reside in the cloud and/or locally in a local computing environment (e.g., at one or more specified locations).

In addition to the processor 108 and/or the memory 104 described above, the system 100 can include one or more computer and/or machine readable, writable, and/or executable components and/or instructions. When executed by the processor 108, these components and/or instructions can enable performance of one or more operations defined by the component(s) and/or instruction(s).

In some embodiments, the knowledge graph generated by the generation component 102 can be composed of a plurality of nodes. The plurality of nodes can comprise at least one of: plain text extraction, scanned PDF understanding through element classification, or OCR extracted entities.

In some embodiments, the identification component 110 can identify the link using semantic matching. In various embodiments, the extraction component 116 can identify the link using cosine similarity. In other embodiments the identified link can be associated with a functionality. In some embodiments, the extracted link can be a hyperlink that is relevant to a user.

In various embodiments, the detection component 114 can detect the dark patterns by identifying unnecessary deflecting visual effects that increase navigation time. The detection component 114 can perform geospatial detection of functionalities in a web layout.

The system 100 can modulate dark patterns in correlation with personalized knowledge graph for reducing the device/site navigation time in a seamless fashion. The system 100 can crawl through a website and/or app and can further build a knowledge graph mined through crawling the website and/or the app. In the case of UI/UX components on apps, where textual data cannot be crawled, optical character recognition (OCR) enabled text extraction can be used to extract node information to build the knowledge graph. The system 100 can take user query as input (e.g., via intent component 106). The query can contain a feature or "intent." The system 100 can infer or determine the intent (e.g., via intent component 106). For example, the system 100 could determine that the intent is to close an account or switch off tracking. The system 100 can take a user to a desired functionality through a most appropriate navigation route, instead of the user manually going through complex hierarchy levels of the website or app in order to reach the target feature. That is, the system 100 can infer an intent from a query, wherein the intent corresponds to a target end feature. The system 100 can identify the target end feature and present the end feature to a user, thereby saving the user from having to manually navigate dark patterns in order to reach the target end feature. The system 100 can identify a target end feature by using NLP enabled technologies, such as entity extraction, intent detection, semantic similarity, and/or bag of words. The system 100 can further identify a target end feature by using search engine technologies related to information retrieval.

The system 100 can identify a target feature set (e.g., via the identification component 110) based on an initial set of reference data, referred to as a "ground truth." This ground truth can include specific actions or options that a user may seek within a system or application. For instance, the ground truth may define links or actions such as: initiating a return order process, starting a chat with a human representative, accessing a bank assistant, disabling location tracking, turning off targeted advertisements, disabling audio tracking through a microphone, deleting personal data (e.g., location history, browsing history, or device tracking information), requesting refunds, or escalating an issue related to the non-delivery of products. By leveraging this initial ground truth, the system can effectively identify and prioritize features that align with user needs or regulatory requirements.

The system 100 can identify target features through time parameterized A/B testing and subject matter expert (SME) driven validation. A/B testing is a method of comparing two (or more) versions of a system, feature, or interface to determine which performs better. A/B testing can involve splitting users or traffic (e.g., a portion of users sees version "A," another portion sees version "B."), measuring outcomes (e.g., metrics such as click-through rates, engagement, or conversion rates can be tracked), and decision making (e.g., a version that achieves a desired outcome can be deemed more effective). SME driven validation can refer to leveraging expertise of professionals with knowledge in a specific domain to evaluate or refine a system, feature, or outcome. SMEs can review results of A/B testing or experimental data to ensure alignment with best practices, regulatory standards, and/or user expectations. This validation can provide qualitative insights to complement quantitative A/B test results. For example, A/B testing can ensure data-driven feature optimization based on user behavior, and SME-driven validation can ensure chosen features are viable, compliant, and meaningful from an expert perspective. For example, the system 100 can consider a task "T" to be executed with a certain confidence level for the given user "U." A task is defined as when the user is trying to go through the UI layers of a website/app. For a given task level, the system 100 can initiate a time trigger "t" and capture the sequence of steps "{S1, S2, S3 . . . SN}" using a screen capture CNN model. The system 100 can construct a tree data structure when a user starts off and navigates through UI layers. The system 100 can compute the difference in transitioning from any sequence $S_i$ to $S_j$, such that $\Delta t=t_j-t_i$. If the user stops navigating and stays on a particular sequence "S" number in a given task "T," the system 100 can label the feature as a possible contender as a target feature to be verified by an SME. The system 100 can mark the feature as a target feature (for example, once the feature has been verified by an SME). A separate verifying parameter can include whether a total time taken "$\Sigma\ \Delta t$" is greater than a threshold limit identified by the system 100 through hypothesis testing. For example, if a user takes more time to complete a task (e.g. to reach a final target feature), the system 100 can identify the feature as a possible contender target feature. The system 100 can select the identified target feature contender as a possible candidate for SME verification, and ca submit the target feature contender for SME verification. Once an SME verifies the contender as a final target feature, the system 100 can add the target feature to a database of target features in a website which a user may desire to reach, and which the user is spending disproportionately (e.g., unnecessarily) large amount of time or efforts to reach.

The system 100 can deduce the importance of identified target features (e.g., via identification component 110). The system 100 can assign random weights to an identified set of target features {w1, w2, w3 . . . wn}. The system 100 can increment a weight matrix "W" through gradient descent based on a corresponding delta matrix of time differences for each sequence.

The system 100 can generate a knowledge graph a website or app (e.g., via generation component 102). The knowledge graph can be comprised of nodes. The nodes can include plan text extraction from the website or app, scanned PDF understanding through element classification OCR extracted entities. From the knowledge graph, the system 100 can identify target features with greater weights through cosine similarity and/or semantic matching.

The system 100 can display extracted links of hidden features (e.g. via extraction component 116). For example, the system 100 can display hyperlinks to webpages that can be relevant to a user's requirements. The system 100 can display direct links to web-components and app shortcuts which can be relevant to a user's requirements. The system 100 can receive feedback and implement feedback-based rank improvement of webpages/web-components. The improvements can be based on whether time taken by a user was less than a usual time of arrival through manual search.

The system 100 can define a user interface (e.g., via extraction component 116). For example, the system 100 can identify a website/app intent and visual affects using screen capture, and can record the identified intent at a time frame. The system can leverage convolutional neural networks (CNNs) with OCR as an image capture keylogger in order to capture a sequence of frame buffers F={f1, f2 . . . fn} at time intervals with the received query (i.e. query Q with segmented frames and time={T1, T2 . . . Tn} corresponding to frames). The system 100 can highlight the relevant hierarchy. The system 100 can create a separate and distinct version. Versioning can occur by invoking a rest endpoint running in a backend to generate a new version based on a modified endpoint for navigating towards a particular area/section. The system 100 can filter out unnecessary action features by reversing the patterns, removing unnecessary or distracting colors, and/or reducing unnecessary or distracting fonts. The system 100 can perform these actions based on determined relevancy scores and/or distraction scores (e.g. pertaining to identified dark patterns). For example, a positive relevancy score of >0.8 can increase a confidence level in a displayed navigation mechanism which, can be a correlated function of time, query and frame buffer segmented in a time series format. In another example, a negative score or distraction score can indicate a high chance of dark pattern convolution, which can feed into a CNN endpoint to re-carve the endpoint being invoked, thereby creating an easier path. Feedback for capturing time-navigation competency can be re-evaluated by the system 11 for a user in order to compute a new score, via the system 100, in an iterative fashion.

Figure 2:
Figure 2:
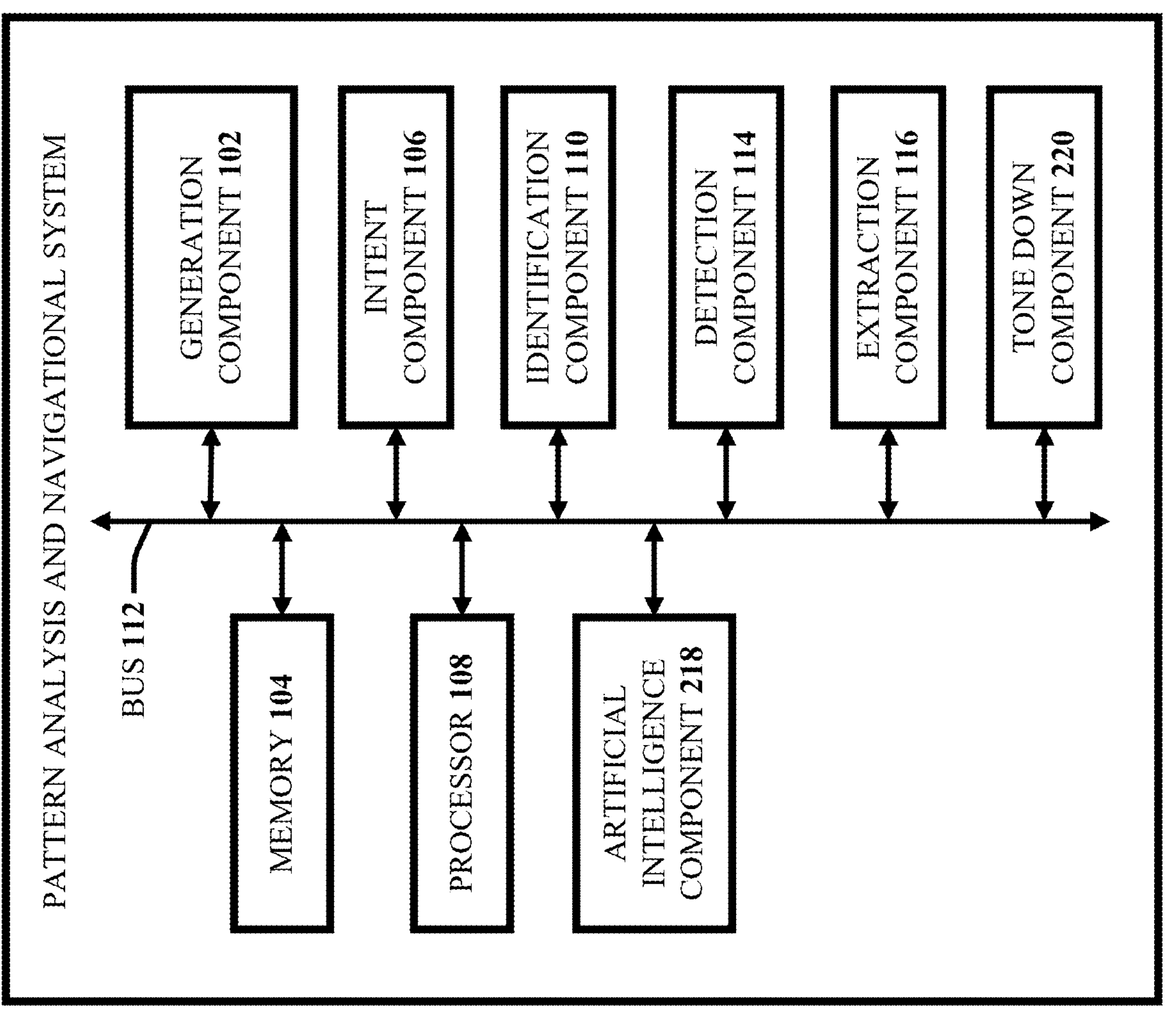

FIG. 2 illustrates an example system 200 that can facilitate reduction of navigation time for devices and sites. The system 200 uses a generation component, an intent component, an identification component, a detection component, an extraction component, a tone down component, and an artificial intelligence component.

The system 200 can also include a memory 204, a processor 208, and a system bus 212. Description of like components has been omitted for the sake of brevity.

In various embodiments, the tone down component 220 can tone down detected dark patterns. The tone down component 220 can tone down the detected dark patterns by standardizing fonts and visual effects. The tone down component 220 can make weighted tone adjustments (e.g., visual color adjustments, animation adjustments, etc.) to features. The tone down component 220 can use the W matrix to adjust user experience by: adjusting a font of a target feature according to its weight, adjusting visual effects of a target feature according to weight, and/or resizing a screen/display area occupied according to the W matrix.

In various embodiments, the artificial intelligence component 218 can build a generative artificial intelligence model to facilitate target feature identification and dark pattern reduction.

The systems and/or devices are described herein with respect to interaction between one or more components. Such systems and/or components can include the components and/or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity but known by those of skill in the art.

Figure 3:
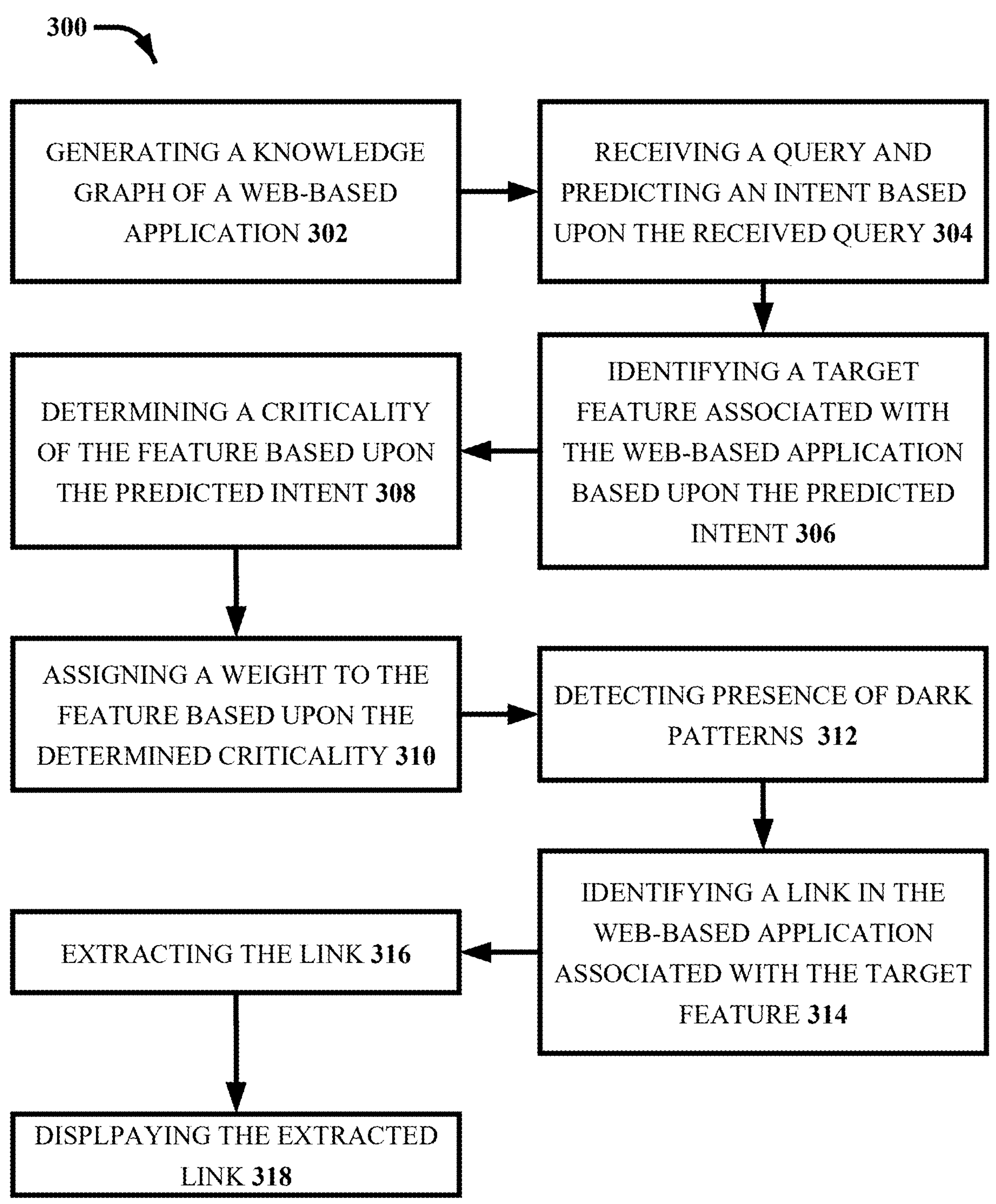
FIGS. 3 and 4 illustrate example computer-implemented methods that can facilitate reduction of navigation time for devices and sites in accordance with some embodiments described herein.

FIG. 3 illustrates an example computer-implemented method 300 that can facilitate reduction of navigation time for devices and sites in accordance with some embodiments described herein, such as with the system 200 of FIG. 2 or the system 100 of FIG. 1.

For simplicity of explanation, the computer-implemented methods provided herein are depicted and/or described as a series of actions. It is to be understood that the subject matter is not limited by the actions illustrated and/or by the order thereof. For example, actions can occur in one or more orders, concurrently, and/or with other acts not presented and described herein. Furthermore, not all illustrated actions can be utilized to implement the computer-implemented methods in accordance with the described subject matter. In addition, the computer-implemented methods could alternatively be represented as a series of interrelated states via a state diagram or events. Additionally, the computer-implemented methods described in this specification are capable of being stored on an article of manufacture to facilitate transporting and transferring the computer-implemented methods to computers. The term article of manufacture, as used herein, encompasses a computer program accessible from any computer-readable device or storage media.

While the method 300 is described relative to the system 200 of FIG. 2, the method 300 can be applicable also to other systems described herein. Repetitive description of like elements and/or processes employed in respective embodiments is omitted for sake of brevity.

At 302, the method 300 includes generating a knowledge graph of a web-based application. The method 300 can use a system operatively coupled to the processor (e.g., generation component 102) to generate the knowledge graph. In various embodiments, the knowledge graph can be composed of a plurality of nodes. The plurality of nodes can comprise at least one of: plain text extraction, scanned PDF understanding through element classification, or OCR extracted entities.

At 304, the method 300 includes receiving a query and predicting an intent based upon the received query. A system (e.g., intent component 106) can receive the query and/or predict the intent.

At 306, the method 300 includes identifying a target feature associated with the web-based application based upon the predicted intent. A system (e.g., identification component 110) can identify the target feature.

At 308, the method 300 includes determining a criticality of the feature based upon the predicted intent. A system (e.g. identification component 110) can determine the criticality of the feature.

At 310, the method 300 includes assigning a weight to the feature based upon the determined criticality. A system (e.g., identification component 110) can assign the weight to the feature.

At 312, the method 300 includes detecting presence of dark patterns. A system (e.g., detection component 114) can detect the dark patterns. In various embodiments, the detected dark patterns can further comprise unnecessary deflecting visual effects that increase navigation time.

At 314, the method 300 includes identifying a link in the web based application associated with the target feature. A system (e.g. extraction component 116) can identify the link. In various embodiments, the method 300 can further comprise using semantic matching to identify the link. In other embodiments, the method 300 can further comprise using cosine similarity to identify the link.

At 316, the method 300 includes extracting the link. A system (e.g., extraction component 116) can extract the link.

At 318, the method 300 includes displaying the extracted link. A system (e.g., extraction component 116) can display the extracted link.

Figure 4:
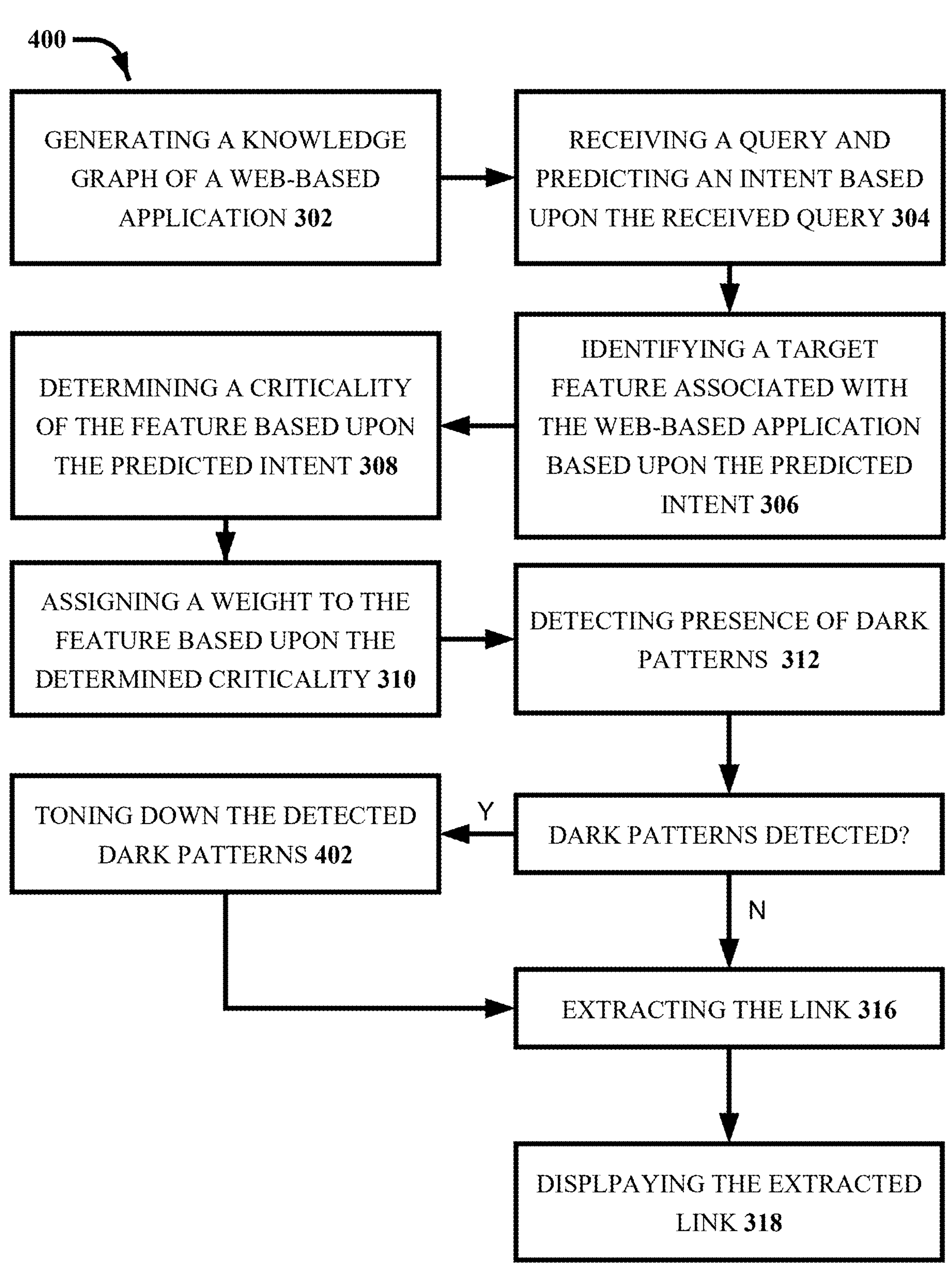

Next, FIG. 4 illustrates an example computer-implemented method 400 that can facilitate reduction of navigation time for devices and sites in accordance with some embodiments described herein, such as with the system 200 of FIG. 2 or the system 100 of FIG. 1. While the method 400 is described relative to the system 200 of FIG. 2, the method 400 can be applicable also to other systems described herein. Repetitive description of like elements and/or processes employed in respective embodiments is omitted for sake of brevity.

At 312, the method 400 includes detecting presence of dark patterns. A system (e.g., detection component 114) can detect the dark patterns.

If dark patterns are detected, the method 400 proceeds to 402. At 402, the method 400 includes toning down the detected dark patterns. A system (e.g., tone down component 220) can tone down the dark patterns. The method 400 then proceeds to 316.

If dark patterns are not detected, the method 400 proceeds directly to 316. At 316, the method 300 includes extracting the link. A system (e.g., extraction component 116) can extract the link.

At 318, the method 300 includes displaying the extracted link. A system (e.g., extraction component 116) can display the extracted link.

The method 400 can include training a large language model to identify target features, identify dark patterns, and/or reduce dark patterns.

Figure 5:
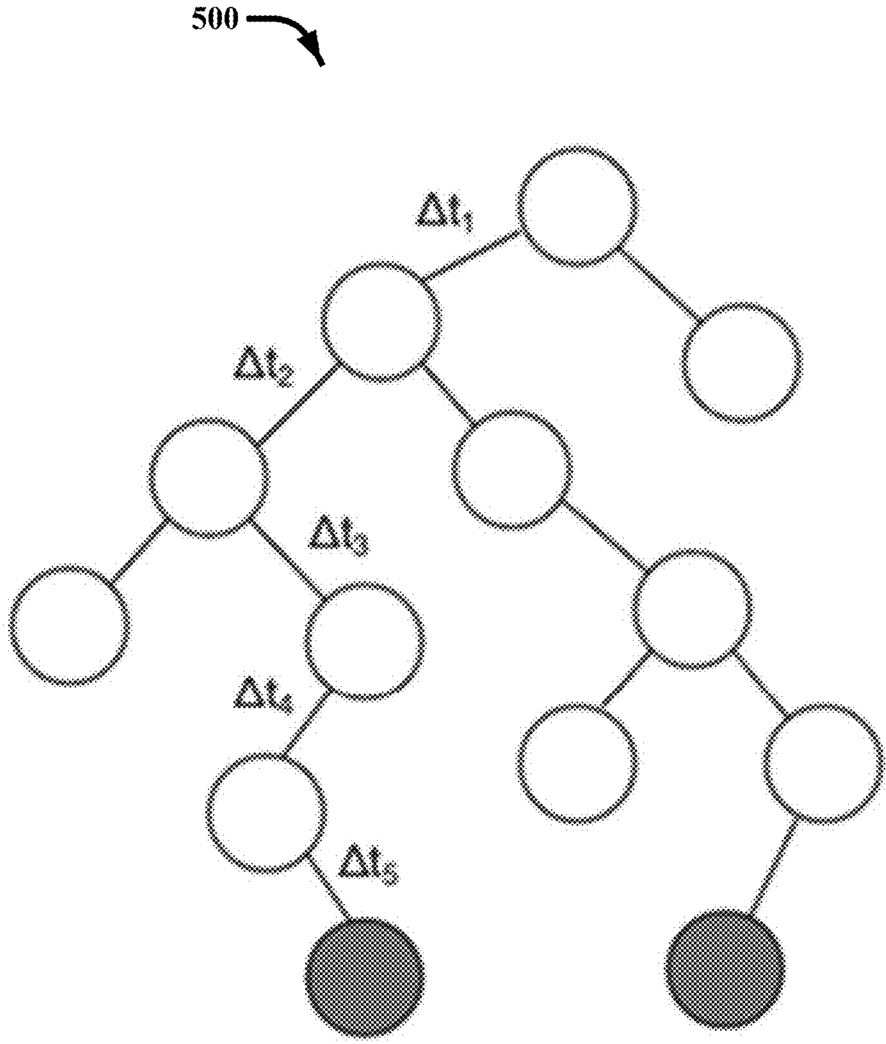
FIG. 5 illustrates an example implementation of one or more methods described herein that can facilitate reduction of navigation time for devices and sites in accordance with some embodiments described herein.

Next, FIG. 5 illustrates an example implementation 500 of one or more methods described herein that can facilitate reduction of navigation time for devices and sites in accordance with some embodiments described herein, such as the method 300 of FIG. 3 or the method 400 of FIG. 4. Repetitive description of like elements and/or processes employed in respective embodiments is omitted for sake of brevity. More particularly, the example implementation 500 can include identifying target features through time parameterized A/B testing and SME driven validation. For example, a system (e.g., system 100 or system 200) can consider a task "T" to be executed with a certain confidence level for the given user "U." A task is defined as when the user is trying to go through the UI layers of a website/app. For a given task level, the system can initiate a time trigger "t" and capture the sequence of steps "{S1, S2, S3 . . . SN}" using a screen capture CNN model. The system can construct a tree data structure when a user starts off and navigates through UI layers. The system can compute the difference in transitioning from any sequence $S_i$ to $S_j$, such that $\Delta t = t_j - t_i$. If the user stops navigating and stays on a particular sequence "S" number in a given task "T," the system can label the feature as a possible contender as a target feature to be verified by an SME. The system can mark the feature as a target feature (for example, once the feature has been verified by an SME). A separate verifying parameter can include whether a total time taken "$\Sigma \Delta t$" is greater than a threshold limit identified by the system through hypothesis testing. For example, if a user takes more time to complete a task (e.g. to reach a final target feature), the system can identify the feature as a possible contender target feature. The system can select the identified target feature contender as a possible candidate for SME verification, and ca submit the target feature contender for SME verification. Once an SME verifies the contender as a final target feature, the system can add the target feature to a database of target features in a website which a user may desire to reach, and which the user is spending disproportionately (e.g., unnecessarily) large amount of time or efforts to reach.

Figure 6:
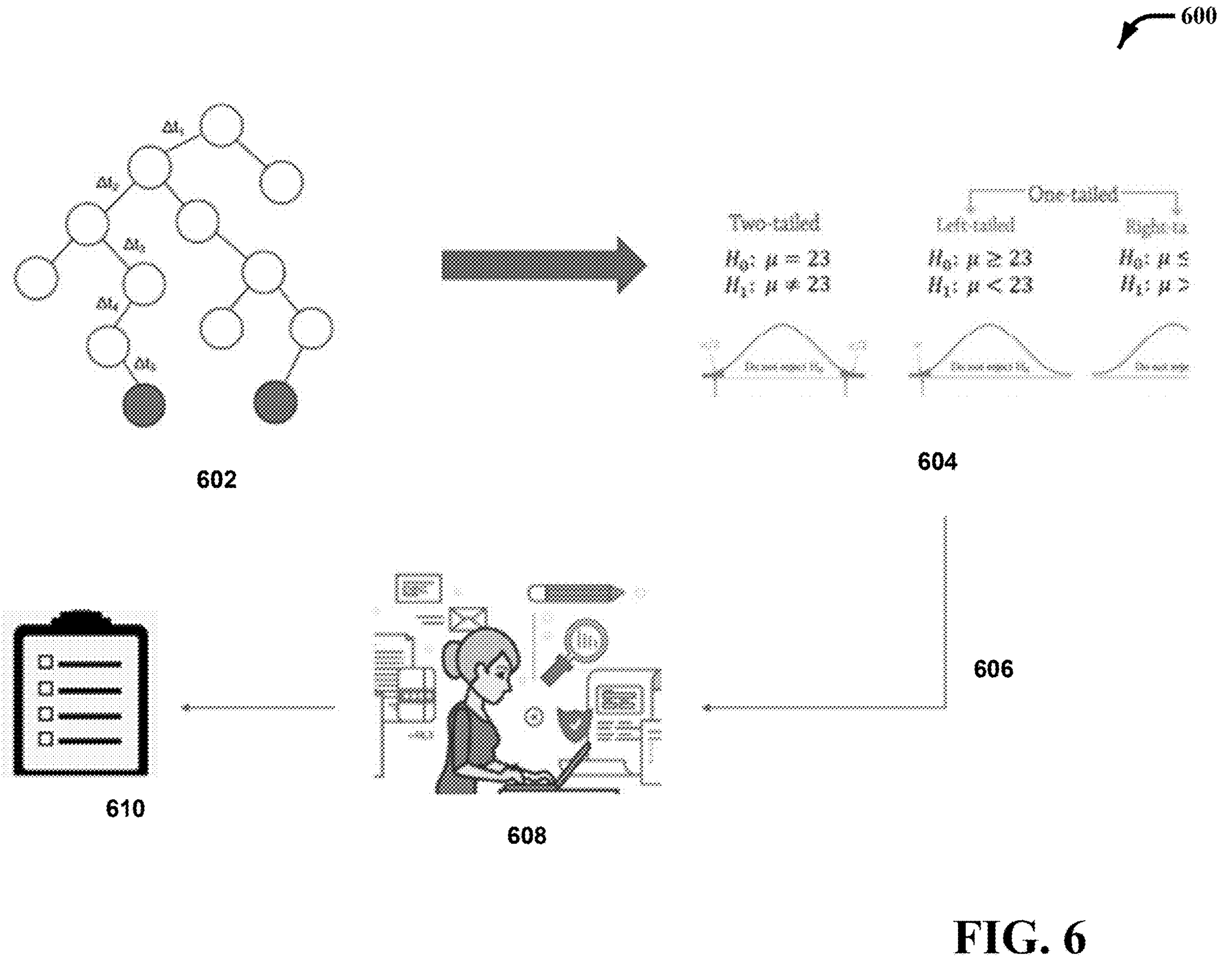
FIGS. 6 and 7 illustrate example methods that can facilitate reduction of navigation time for devices and sites in accordance with some embodiments described herein.

Next, FIG. 6 illustrates a flow diagram of a method 600 that can facilitate reduction of navigation time for devices and sites in accordance with some embodiments described herein, such as with the system 200 of FIG. 2 or the system 100 of FIG. 1. While the method 600 is described relative to the system 200 of FIG. 2, the method 600 can be applicable also to other systems described herein such as the system 100 of FIG. 1.

At 602, the method 600 includes calculating a total time taken by a user to perform a specific task (e.g., to reach a target end feature). A system operatively coupled to the processor (e.g., identification component 110) can calculate the total time taken by the user.

At 604, the method 600 includes performing hypothesis testing to identify target tasks for which a user took an unusually large amount of time. A system (e.g., identification component 110) can perform the hypothesis testing and target task identification.

At 606, the method 600 includes suggesting recommendations for contender tasks. The contender tasks can be partially hidden in a website or app. The contender tasks can be crucial for a user. A system (e.g., identification component 110, extraction component 116) can suggest recommendations for contender tasks.

At 608, the method 600 includes an SME finalizing rank-edits of target features. The SME can utilize a system (e.g., identification component 110) to perform the finalizing rank-edits of target features.

At 610, the method 600 includes finalizing target feature weights. A system (e.g., identification component 110) can finalize the target feature weights.

Figure 7:

Next, FIG. 7 illustrates a flow diagram of a method 700 that can facilitate reduction of navigation time for devices and sites in accordance with some embodiments described herein, such as with the system 200 of FIG. 2 or the system 100 of FIG. 1. While the method 700 is described relative to the system 200 of FIG. 2, the method 600 can be applicable also to other systems described herein such as the system 100 of FIG. 1.

At 702, the method 700 includes initializing weights randomly and incrementing the weights in proportion to changes in time taken at each step. A system operatively coupled to the processor (e.g., identification component 110) can initialize and increment the weights.

At 704, the method 700 includes performing hypothesis testing to identify target tasks for which a user took an unusually large amount of time. A system (e.g., identification component 110) can perform the hypothesis testing and target task identification.

At 706, the method 700 includes ranking target features according to weights and suggesting rank edits to an SME. A system (e.g., identification component 110) can rank the target features according to weights and suggest the rank edits to an SME.

At 708, the method 700 includes an SME finalizing rank-edits of target features. The SME can utilize a system (e.g., identification component 110) to perform the finalizing rank-edits of target features.

At 710, the method 700 includes finalizing target feature weights. A system (e.g., identification component 110) can finalize the target feature weights.

Figure 8:
FIG. 8 illustrates an example use case of unnecessary navigation time for devices and sites.
Figure 8:

Next, FIG. 8 illustrates an example use case 800 of unnecessary navigation time for devices and sites. The non-limiting example use case illustrates issues with current systems and devices that lack the capabilities of the invention disclosed herein. More particularly, the use case 800 demonstrates that user's without the technologies disclosed herein must manually navigate through multiple pages of a website or app in order to reach a desired target feature (e.g., in order to perform a desired task). In the use case 800, a user desiring to limit add tracking must navigate through multiple pages of an application in order to reach the target end feature that allows the user to limit add tracking. In contrast, users utilizing the systems, methods, or computer-program products disclosed herein could bypass this needless manual navigation by issuing a query that specifies the intent of the user to limit add tracking.

Figure 9:
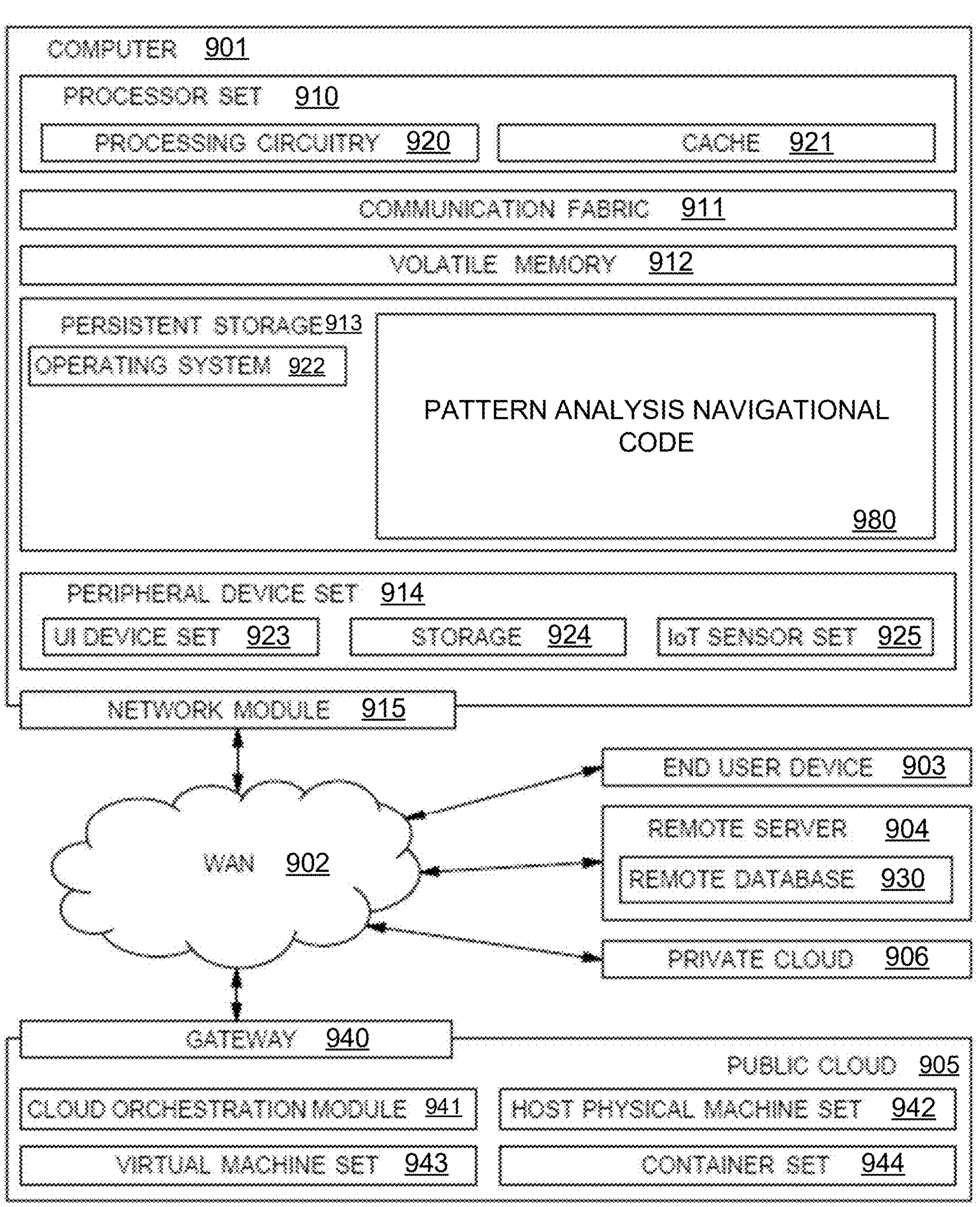
FIG. 9 illustrates a block diagram of an example computing environment in which some embodiments described herein can be facilitated.

FIG. 9 and the following discussion are intended to provide a brief, general description of a suitable computing environment 900 in which some embodiments described herein can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as identifying a link in a web-based application associated with a target feature, extracting the link, and displaying the extracted link with pattern analysis navigational code 980. In addition to block 980, computing environment 900 includes, for example, computer 901, wide area network (WAN) 902, end user device (EUD) 903, remote server 904, public cloud 905, and private cloud 906. In this embodiment, computer 901 includes processor set 914 (including processing circuitry 920 and cache 921), communication fabric 911, volatile memory 912, persistent storage 913 (including operating system 922 and block 945, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method can be distributed among multiple computers and/or between multiple locations. On the other hand, in this presentation of computing environment 900, detailed discussion is focused on a single computer, specifically computer 901, to keep the presentation as simple as possible. Computer 901 can be located in a cloud, even though it is not shown in a cloud in FIG. 9. On the other hand, computer 901 is not required to be in a cloud except to any extent as can be affirmatively indicated.

PROCESSOR SET 910 includes one, or more, computer processors of any type now known or to be developed in the future. Processing circuitry 920 can be distributed over multiple packages, for example, multiple, coordinated integrated circuit chips. Processing circuitry 920 can implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set can be located "off chip." In some computing environments, processor set 910 can be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods can be stored in block 945 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory can be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 can be a read only memory (ROM), but typically at least a portion of the persistent storage allows writing of data, deletion of data and re-writing of data. Some familiar forms of persistent storage include magnetic disks and solid-state storage devices. Operating system 922 can take several forms, such as various known proprietary operating systems or open-source Portable Operating System Interface type operating systems that employ a kernel. The code included in block 945 typically includes at least some of the computer code involved in performing the inventive methods.

PERIPHERAL DEVICE SET 914 includes the set of peripheral devices of computer 901. Data communication connections between the peripheral devices and the other components of computer 901 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 can include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 can be persistent and/or volatile. In some embodiments, storage 924 can take the form of a quantum computing storage device for storing data in the form of qubits. In embodiments where computer 901 is required to have a large amount of storage (for example, where computer 901 locally stores and manages a large database) then this storage can be provided by peripheral storage devices designed for storing large amounts of data, such as a storage area network (SAN) that is shared by multiple, geographically distributed computers. IoT sensor set 925 is made up of sensors that can be used in Internet of Things applications. For example, one sensor can be a thermometer, and another sensor can be a motion detector.

NETWORK MODULE 915 is the collection of computer software, hardware, and firmware that allows computer 901 to communicate with other computers through WAN 902. Network module 915 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and can take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 can be a client device, such as thin client, heavy client, mainframe computer and/or desktop computer.

REMOTE SERVER 904 is any computer system that serves at least some data and/or functionality to computer 901. Remote server 904 can be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data can be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs can be stored as images and can be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware and firmware allowing public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1175 and private cloud 1176 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of some of the embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of some of the embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of some of the embodiments described herein.

Aspects of some of the embodiments described herein are described with reference to flowchart illustrations and/or block diagrams of methods, apparatus (systems), and computer program products according to some embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to some embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that some of the embodiments herein also can be implemented at least partially in parallel with one or more other program modules. Generally, program modules include routines, programs, components and/or data structures that perform particular tasks and/or implement particular abstract data types. Moreover, the described computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the various embodiments, but one of ordinary skill in the art can recognize that many further combinations and/or permutations of the various embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a processor that executes computer executable components stored in memory, wherein the computer executable components comprise:

a generation component that generates a knowledge graph of a web-based application;

an intent component that receives a query and predicts an intent based upon the received query;

an identification component that identifies a target feature associated with the web-based application based upon the predicted intent, determines a criticality of the feature based upon the predicted intent, and assigns a weight to the feature based upon the determined criticality, wherein the target feature is identified based upon navigation through user interface layers of the web-based application;

a detection component that detects presence of dark patterns by identifying unnecessary deflecting visual effects that increase navigation time, capturing a sequence of steps associated with navigation through the user interface layers, and computing differences in transition times between the sequence of steps; and an extraction component that, upon a detection of dark patterns by the dark pattern detection component, identifies a link in the web-based application associated with the target feature, extracts the link, and displays the extracted link, wherein the extraction component extracts the link by generating a modified endpoint for navigating towards a particular area or section of the web-based application from the identified link, and creates an easier path by re-carving the modified endpoint based upon a distraction score associated with the detected dark patterns.

2. The system of claim 1, wherein the knowledge graph generated by the generation component is composed of a plurality of nodes.

3. The system of claim 2, wherein the plurality of nodes comprise at least one of: plain text extraction, scanned PDF understanding through element classification, or OCR extracted entities.

4. The system of claim 1, wherein the identification component identifies the link using semantic matching.

5. The system of claim 1, wherein the extraction component identifies the link using cosine similarity.

6. The system of claim 1, wherein the identified link is associated with a functionality.

7. The system of claim 1, wherein the extracted link is a hyperlink that is relevant to a user.

8. The system of claim 1, wherein the detection component detects the dark patterns by identifying unnecessary deflecting visual effects that increase navigation time.

9. The system of claim 8, wherein the detection component performs geospatial detection of functionalities in a web layout.

10. The system of claim 1, further comprising a tone down component that tones down the detected dark patterns.

11. The system of claim 10, wherein the tone down component tones down the detected dark patterns by standardizing fonts and visual effects.

12. The system of claim 1, further comprising an artificial intelligence component that builds a generative artificial intelligence model to facilitate target feature identification and dark pattern reduction.

13. A computer-implemented method that utilizes a processor that executes computer executable components stored in memory to perform the following acts:

generating a knowledge graph of a web-based application;

receiving a query and predicting an intent based upon the received query;

identifying a target feature associated with the web-based application based upon the predicted intent, wherein the target feature is identified based upon navigation through user interface layers of the web-based application;

determining a criticality of the feature based upon the predicted intent;

assigning a weight to the feature based upon the determined criticality;

detecting presence of dark patterns by identifying unnecessary deflecting visual effects that increase navigation time, capturing a sequence of steps associated with navigation through the user interface layers, and computing differences in transition times between the sequence of steps;

upon a detection of dark patterns, identifying a link in the web-based application associated with the target feature;

extracting the link, wherein extracting the link further comprises generating a modified endpoint from the identified link for navigating towards a particular area or section of the web-based application, and creating an easier path by re-carving the modified endpoint based upon a distraction score associated with the detected dark patterns; and displaying the extracted link.

14. The method of claim 13, wherein the knowledge graph is composed of a plurality of nodes.

15. The method of claim 14, wherein the plurality of nodes comprise at least one of: plain text extraction, scanned PDF understanding through element classification, or OCR extracted entities.

16. The method of claim 13, further comprising using semantic matching to identify the link.

17. The method of claim 13, further comprising using cosine similarity to identify the link.

18. The method of claim 13, further comprising, upon a detection of dark patterns, toning down the detected dark patterns.

19. The method of claim 13, wherein the detected dark patterns further comprise unnecessary deflecting visual effects that increase navigation time.

20. A computer program product comprising a computer readable storage medium having program instructions embodied therewith, the program instructions executable by a processor to cause the processor to:

generate a knowledge graph of a web-based application;

receive a query and predicting an intent based upon the received query;

identify a target feature associated with the web-based application based upon the predicted intent, wherein the target feature is identified based upon navigation through user interface layers of the web-based application;

determine a criticality of the feature based upon the predicted intent;

assign a weight to the feature based upon the determined criticality;

detect presence of dark patterns by identifying unnecessary deflecting visual effects that increase navigation time, capturing a sequence of steps associated with navigation through the user interface layers, and computing differences in transition times between the sequence of steps;

upon a detection of dark patterns, identify a link in the web-based application associated with the target feature;

generate, from the identified link, a modified endpoint for navigating towards a particular area or section of the web-based application;

create an easier path by re-carving the modified endpoint based upon a distraction score associated with the detected dark patterns;

extract the modified endpoint as the link; and display the extracted link.

* * * * *